US008687820B2

(12) United States Patent
Truong et al.

(10) Patent No.: US 8,687,820 B2
(45) Date of Patent: Apr. 1, 2014

(54) STEREO MICROPHONE PROCESSING FOR TELECONFERENCING (75) Inventors: Kwan K. Truong, Lilburn, GA (US);
Peter Chu, Lexington, MA (US);
Michael A. Pocino, Marietta, GA (US)

(73) Assignee: Polycom, Inc., San Jose, CA (US)

( * ) Notice: Subject to any disclaimer, the term of this patent is extended or adjusted under 35 U.S.C. 154(b) by 1481 days.

(21) Appl. No.: 10/881,008

(22) Filed: Jun. 30, 2004

(65) Prior Publication Data

US 2006/0013416 A1    Jan. 19, 2006

(51) Int. Cl.
*H04R 3/00* (2006.01)
*H04M 3/42* (2006.01)

(52) U.S. Cl.
USPC ...... 381/92; 381/122; 379/202.01; 348/14.08

(58) Field of Classification Search
USPC ......... 381/92, 98, 77–85, 310–311, 119, 110, 381/56–57, 1–26, 122; 704/E11.003; 379/202.01–207.01; 348/E7.003, 348/14.01–14.12
See application file for complete search history.

(56) References Cited

U.S. PATENT DOCUMENTS

| 3,694,578 | A | * | 9/1972 | Reid ................................. 381/77 |
| 3,755,625 | A | * | 8/1973 | Maston ..................... 379/206.01 |
| 4,449,238 | A |   | 5/1984 | Lee et al. |
| 4,658,425 | A |   | 4/1987 | Julstrom |
| 4,961,211 | A | * | 10/1990 | Tsugane et al. ............ 348/14.08 |
| 5,060,273 | A |   | 10/1991 | Olah et al. |
| 5,121,426 | A | * | 6/1992 | Baumhauer et al. ..... 379/420.03 |
| 5,206,913 | A |   | 4/1993 | Sims |
| 5,259,035 | A |   | 11/1993 | Peters et al. |
| 5,506,910 | A |   | 4/1996 | Miller et al. |
| 5,561,737 | A | * | 10/1996 | Bowen .......................... 704/275 |
| 5,631,967 | A |   | 5/1997 | Wagner et al. |
| 5,828,756 | A |   | 10/1998 | Benesty et al. |
| 5,848,146 | A |   | 12/1998 | Slattery |
| 5,858,756 | A |   | 1/1999 | Hillman et al. |
| 5,889,843 | A | * | 3/1999 | Singer et al. ............. 379/202.01 |
| 5,991,385 | A |   | 11/1999 | Dunn et al. |
| 6,049,607 | A |   | 4/2000 | Marash et al. |

(Continued)

FOREIGN PATENT DOCUMENTS

| EP | 0 682 436 A2 | 11/1995 |
| WO | 9416517 | 7/1994 |
| WO | 97/46048 A1 | 4/1997 |

OTHER PUBLICATIONS

Looperman Audio Resources; "Mixing — Panning for Gold;" www.looperman.com/tutorials_mixing_manning_for_gold.php.

(Continued)

*Primary Examiner* — Xu Mei
(74) *Attorney, Agent, or Firm* — Wong, Cabello, Lutsch, Rutherford & Brucculeri, L.L.P.

(57) ABSTRACT

Methods and devices for improving the intelligibility of audio in a teleconferencing unit. Multiple microphones and multiple audio channels are used, in which only the best microphones are selected to represent each audio channel. Multiple microphones signals may be mixed according to microphones' positions in a room to form a single signal to represent one audio channel. The audio signal may be further processed to effectuate other features.

45 Claims, 7 Drawing Sheets

(56) References Cited

U.S. PATENT DOCUMENTS

| | | | |
|---|---|---|---|
| 6,173,059 B1 | 1/2001 | Huang et al. | |
| 6,408,327 B1 | 6/2002 | McClennon | |
| 6,496,201 B1 | 12/2002 | Baldwin et al. | |
| 6,618,073 B1 | 9/2003 | Lambert | |
| 6,788,337 B1 * | 9/2004 | Fujii | 348/207.99 |
| 6,895,093 B1 | 5/2005 | Ali | |
| 7,260,231 B1 * | 8/2007 | Wedge | 381/310 |
| 7,333,622 B2 * | 2/2008 | Algazi et al. | 381/310 |
| 7,515,721 B2 * | 4/2009 | Tashev et al. | 381/92 |
| 2003/0118200 A1 | 6/2003 | Beaucoup et al. | |
| 2004/0263636 A1 * | 12/2004 | Cutler et al. | 348/211.12 |

OTHER PUBLICATIONS

European Search Report dated Aug. 18, 2009 for corresponding Application No. 05011660.7 - 2225 / 1613124.

First Examination Report dated Nov. 25, 2009; Government of India Patent Office; Application No. 1345/DEL/2005.

International Search Report for Corresponding PCT Case, Serial No. PCT/US03/01974; Jun. 3, 2003.

Supplementary European Search Report received in corresponding application No. EP 03 72 9692 dated Aug. 21, 2008.

IBM Technical Disclosure Bulletin; "Method of Endpoint Detection;" vol. 34. No. 9; Feb. 1992, pp. 267-269.

* cited by examiner

STEREO MICROPHONE PROCESSING FOR TELECONFERENCING

CROSS-REFERENCE TO RELATED APPLICATIONS

The current application is related to a patent application by Michael A. Pocino and Kwan K. Truong, title "Digital Linking of Multiple Microphone Systems," Ser. No. 10/349,419, filed on Jan. 21, 2003, assigned to the same assignee.

BACKGROUND OF THE INVENTION

1. Field of the Invention

This invention relates to teleconferencing, more specifically to the audio components in a teleconference.

2. Description of the Related Art

Teleconferencing has long been an essential tool for communication in business, government and educational institutions. There are many types of teleconferencing equipment. One type of teleconferencing unit is a videoconferencing unit, which transmits real-time images as well as live conversations. A video conferencing unit typically comprises a video processing component and an audio processing component. The video processing component may include a camera to pick up real-time images of conference participants and a video display for showing real-time images of conference participants or still images of documents from either the near end or the far end. The audio portion of a video conferencing unit typically includes one or more microphones to pick up voice signals of conference participants, and loudspeakers to reproduce voices of the participants at the far end. Sometimes, audio conference units, more commonly know as speakerphones, are used instead. The speakerphones transmit only conversations between people at two or more locations.

When many people participate in a teleconference at a conferencing site, a single-microphone conference unit has many problems. Voices from people sitting closer to the microphone may make strong signals while voices from people sitting far away from the microphone may make weak signals. The system gain is typically limited such that the strong signal does not saturate the system or make the system unstable. Because of the gain limit, low voices from persons sitting away from the microphone may be too weak to be intelligible.

Multiple microphones placed around a conference room may be used to alleviate this problem. When multiple microphones are placed around the conference room, there will be one that is close enough to any talkers to be able to pick up the talker's voice. The signals from all microphones will be mixed to make an audio signal, which is processed and transmitted to the far end of the conference. This way the voices from all talkers have similar strength. But the mixing of all microphone signals still has its own problems. Not all talkers are speaking all at the same time. When no one is speaking near a microphone, the signal from that microphone is substantially noise. If all signals from all microphones are mixed together, a large number of noise signals are mixed with one or a few voice signals, reducing the signal/noise ratio. It is desirable to have a conference unit that can make all participants' speech intelligible to the parties on the far ends of the conferencing. It is desirable to increase the signal/noise ratio (SNR).

To improve the SNR, microphone gating or dynamic mixing is used by some prior art teleconference units. When microphone gating is applied in a teleconference unit with multiple microphones, only the microphones with strong enough signals are "gated", i.e. mixed with other microphone signals to form an audio signal. A strong signal in a microphone indicates that the signal is from talkers, not just background noises. When the signal in a microphone is weak, it may indicate that there is no talker nearby and that the signal is mainly from background noise. These microphones are closed, i.e. their signals are excluded from being mixed with other "gated" microphone signals. The microphone gating technique improves the SNR, but still does not provide a very realistic audio field that human ears can appreciate.

Stereo audio and multi-channel audio systems can reproduce more realistic sound fields. The stereo sound field reproduces the spatial relationship between various sound sources. The spatial relationship can make it easier to distinguish speech from different people and make them more intelligible. It is desirable to include stereo sound in a teleconference unit, either a video conference unit or an audio conference unit.

It is desirable to have a method and an apparatus which can improve the teleconferencing capabilities.

BRIEF SUMMARY OF THE INVENTION

According to one embodiment of the current invention, in a teleconferencing unit with multiple microphones, multiple audio channels are maintained and exchanged between conferencing sites. The microphone with the best signal level for each audio channel is selected (gated) while all other microphones are ignored (closed) such that the best signal/noise ratio is achieved.

According to one embodiment, the best microphone may be selected using band-limited analysis. Each signal for a time interval from multiple microphones is split into many sub-bands. For each sub-band, the strongest signal is selected and one vote is given to the microphone where this sub-band is from. The votes for each microphone for all sub-bands are aggregated. The microphone having most votes is selected for that time interval. In an alternative, the microphone is selected for that time interval only if the number of vote exceeds a threshold. If no microphone has a large enough number of votes, then the microphone selected for the last time interval is selected. In another alternative, rather than selecting only one microphone with the most votes, several microphones may be selected. These microphones are selected if each of them has votes that exceed a minimum vote threshold. In an alternative, an intermediate gain between gated (gain=1) and closed (gain=0) is used.

According to another embodiment, a signal from one microphone may be used in more than one audio channel, i.e. audio panning. A portion of a microphone signal for one audio channel may be mixed into another audio channel, depending on the relative location of the microphone. Similarly, signals from several microphones may be mixed to form one audio channel signal. The amount of mixing depends on the relative locations of the microphones.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Methods and devices according to the current invention will improve the audio system in a teleconference unit. The teleconference unit may be either a video conference unit which includes both a video system and an audio system, or an audio conference unit, i.e. a speakerphone which only has an audio system.

Figure 1:
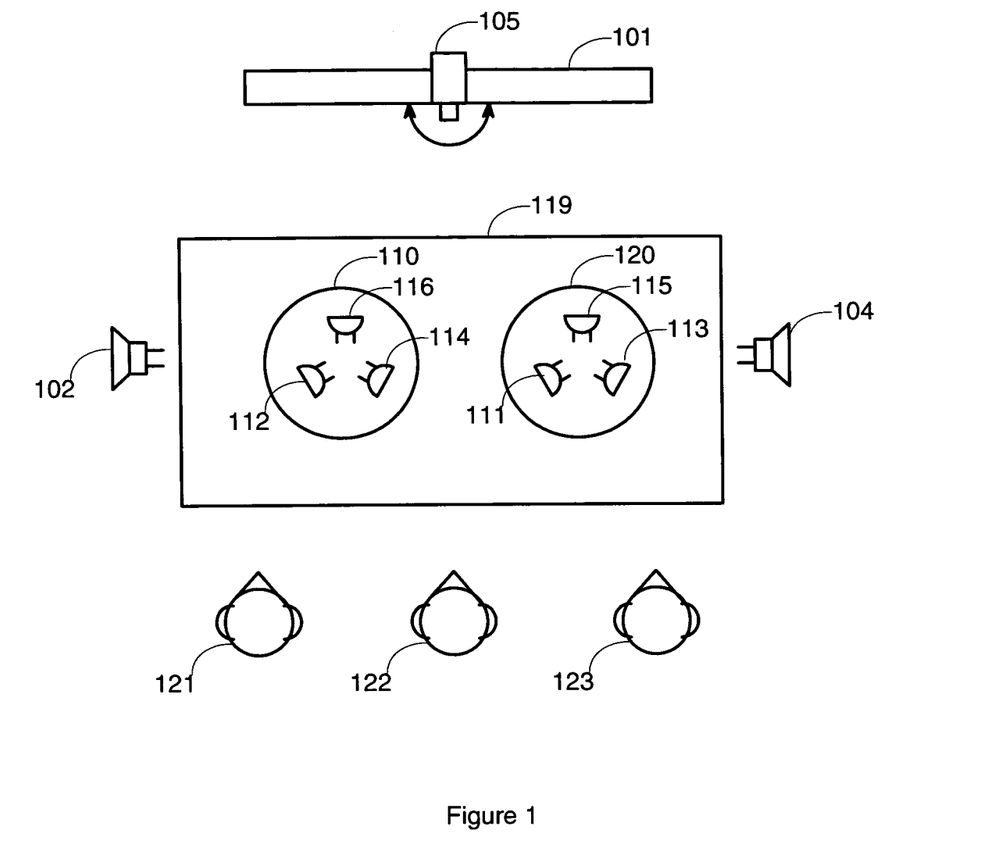
FIG. 1 depicts a typical arrangement of a video conferencing unit in a conference room.
Figure 5:
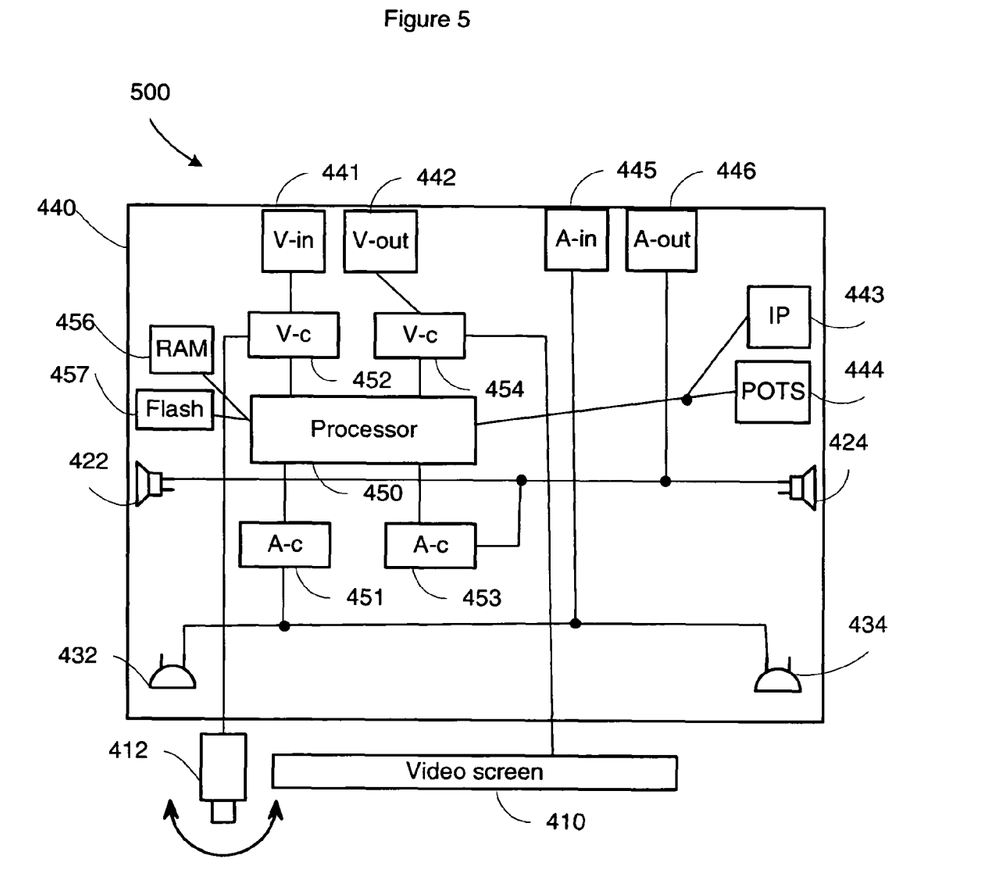
FIG. 5 shows a block diagram of a video conference unit with multiple audio channels.

FIG. 1 illustrates a typical setup for a video conference in a conference room. The video conferencing equipment includes a video display screen 101, a video camera 105 on top of the video display screen 101, loudspeakers 102 and 104, and microphones 112, 114, 116, 111, 113 and 115 in front of a conference table 119. The microphones 112, 114 and 116 are grouped together as right microphones 110 while the microphones 111, 113 and 115 are grouped as left microphones 120. For simplicity, these are the only parts shown in FIG. 1. These parts are all connected to a central module. The central module contains all the signal processing circuitries, control circuitries, network interfaces etc. FIG. 5 illustrates a block diagram of a video conference unit with a few more details of the central module. Conference participants 121, 122 and 123 sit in front of the conference table 119. In this setup there are six microphones in front of the conference participants at this site.

Figure 2:
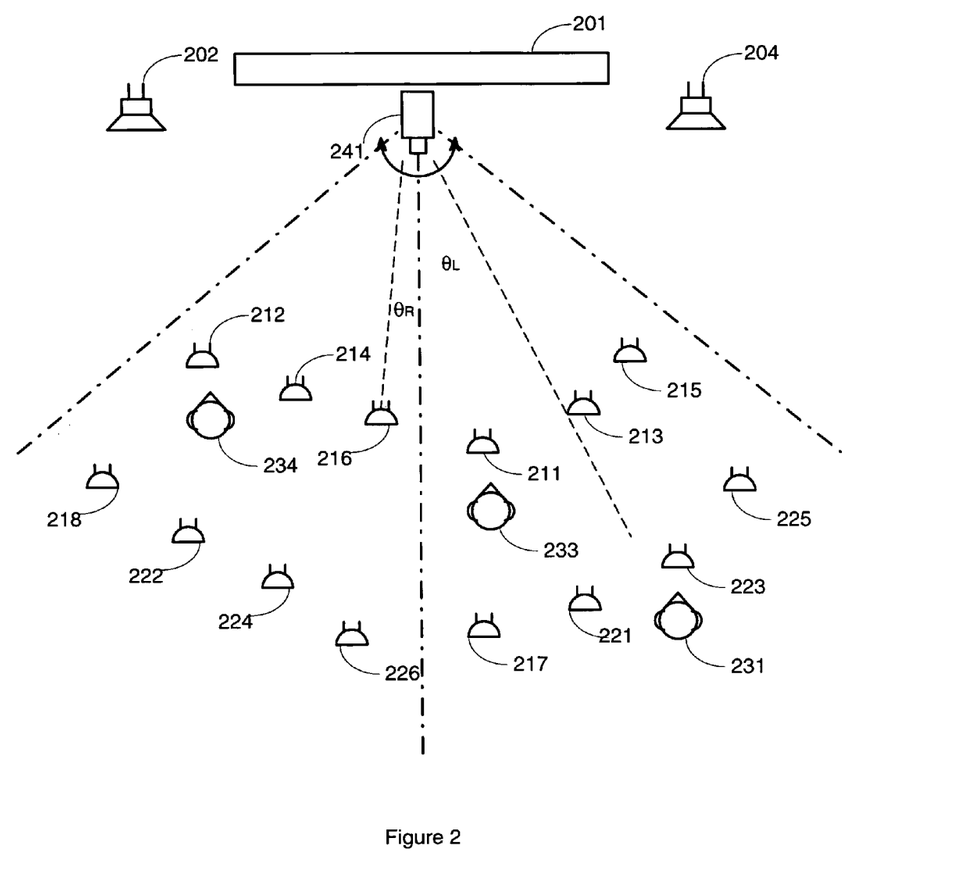
FIG. 2 depicts a large conference room with a stereo audio system including multiple microphones and loudspeakers and using microphone panning technique.

FIG. 2 illustrates another setup for a larger conference room. A video display screen 201 and swivel video camera 121 are in front of the conference room. Loudspeakers are placed around the conference room. Two of them, 202 and 204, are shown. Also shown are the many microphones scattered around in the conference room including microphones 212, 214, 216, 218, 222, 224, 226, 211, 213, 215, 217, 221, 223 and 225. Similar to the setup shown in FIG. 1, the microphones are separated into a right microphone group and a left microphone group. Each group of microphones is used for one audio channel. Conference participants may sit in the conference room along with the microphones. Three of them, 231, 233 and 235 are shown.

FIG. 5 illustrates a block diagram of a video conference unit 500, which may be used in the setups in FIGS. 1 and 2. The video conference unit 500 has a central module 440, which has internal loudspeakers 422 and 424, internal microphones 432 and 434, a connection to an installed camera 412 and a connection to an installed display screen 410. The central module 440 has many interfaces for additional video and audio components: video input interface 441, video output interface 442, audio input interface 445 and audio output interface 446. Each interface has connections to multiple audio or video channels. For example, the video input interface 441 can accept video signals from two additional video cameras. The video output interface 442 may output two video channels, up to four monitors. The audio input interface 445 may accept up to twelve microphones, which can be grouped into up to four audio channels. The audio output interface 446 may output five more audio channels. The signal processing and control is performed by the processor unit 450, which is coupled to various audio/video components or interfaces through intermediates 451, 452, 453 and 454. Those intermediates performs signal conversions, such as DAC and ADC etc. They are shown as separate blocks, but could be integrated into a single module or an integrated chip. The processor unit 450 is supported by RAM 456 and flash memory 457. Signal processing programs may be stored in the flash memory 457. Components profiles, which may be used in certain situations, can be stored in the flash memory 457 too. The central module 440 has several network interfaces, one interface 443 for a digital network and another interface 444 for an analog network, typically for connecting with Plain Old Telephone Service (POTS) lines. The interface 444 has at least two POTS lines, one line for each audio channel. The digital interface 443 may support various digital connections, such as ISDN, Ethernet, or USB. The ISDN connection is mainly used for a video conference connection through ISDN network. The Ethernet or LAN connection is mainly used for video conference through Internet or internally on a corporate network. The USB connection may be used to exchange additional audio/video media streams, such as additional cameras, microphones, computers with additional documents etc.

In the setups in FIGS. 1 and 2, all participants' speech may be picked up by at least one of the microphones. When the audio signals from each microphone are collected and mixed together to form a single audio signal in each audio channel, the talkers' speech can be transmitted to the far end of the teleconference and be reproduced by loudspeakers at the far end. In each of the setups in FIGS. 1 and 2, according to the current invention, the signals from multiple microphones are selected and mixed to form at least two audio channels.

According to an embodiment of the present invention, not all of the microphones are treated equally. Each microphone is gated or closed depending on the signal quality at the microphone. Each microphone may be assigned to a particular audio channel.

For example, referring to FIG. 1, two audio channels are maintained. A right audio channel has microphones 112, 114 and 116. A left audio channel has microphones 111, 113 and 115. If talker 121 is speaking, the audio signal from microphone 112 is the strongest for right channel and microphone 111 has the strongest signals for the left channel. So the audio signal from microphone 112 is selected to represent the right channel while the audio signal from microphone 111 is selected as the representative for the left audio channel. The signal processing may follow the flow-diagram illustrated in FIG. 3. For simplicity, only one signal path is shown, i.e. speeches at a near end site of the video conference are picked up, processed and transmitted to a far end, which are processed and reproduced. There is another signal path, identical to this one, except in the opposite direction, i.e. from the far end to the near end. In the flow diagram shown in FIG. 3, all audio signals from all of the microphones at the near end are collected and sent to arbitrators for each audio channel 142 and 141. The arbitrator 142 or 141 compares the strength of each audio signal from the various microphones. The strongest audio signal from each channel is selected and sent to a mixer 152. The mixer 152 will perform further processing to format or transform the audio signal to the appropriate format for transmitting through a telephone network or a data network 153. For example, each audio channel may use an independent analog phone line to exchange audio signals with the far ends. Or each audio channel may be coded as digital data packets and transmitted to the far ends to be decoded. The formatted data are transmitted to the far end processor 154. Once the far end processor 154 receives the formatted data, where audio signals for the left channel and the right channel are embedded, it separates those two channels. The audio signals for each channel are further processed, for example, the right channel goes to processor 162 and the left channel signal goes to processor 161. The audio signals after amplification and reconditioning are fed to the loudspeakers 172 and 171 and are reproduced as speech.

Figure 3:
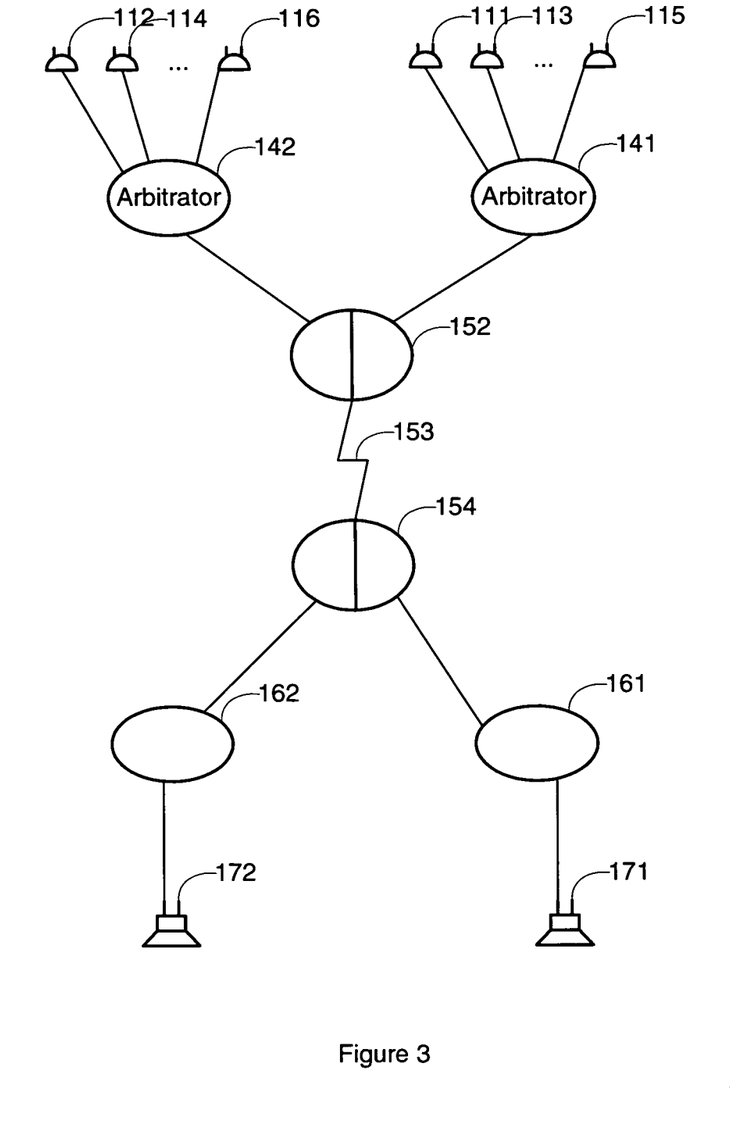
FIG. 3 shows a flow diagram of arbitration of microphone signals and the audio reproduction in a conference system with two audio channels.

In some situations, more than one microphone signal may be selected for each channel. For example, when more than one talker is speaking at the same time at the same conference site, signals from the microphones close to these talkers should be mixed into the audio signal for an audio channel, such that every talker's speech can be heard. In this case, all microphone signals that have high enough signal strength, indicating that someone is talking, are selected by the arbitrators 142 and 141, and processed further.

Still referring to FIG. 3, the different components, such as arbitrator 142; mixer 152, the counterpart of far-end mixer 154; and processor 162 are shown as separate components. They may be physically separate components. They may also be combined or integrated into fewer components.

Figure 4:
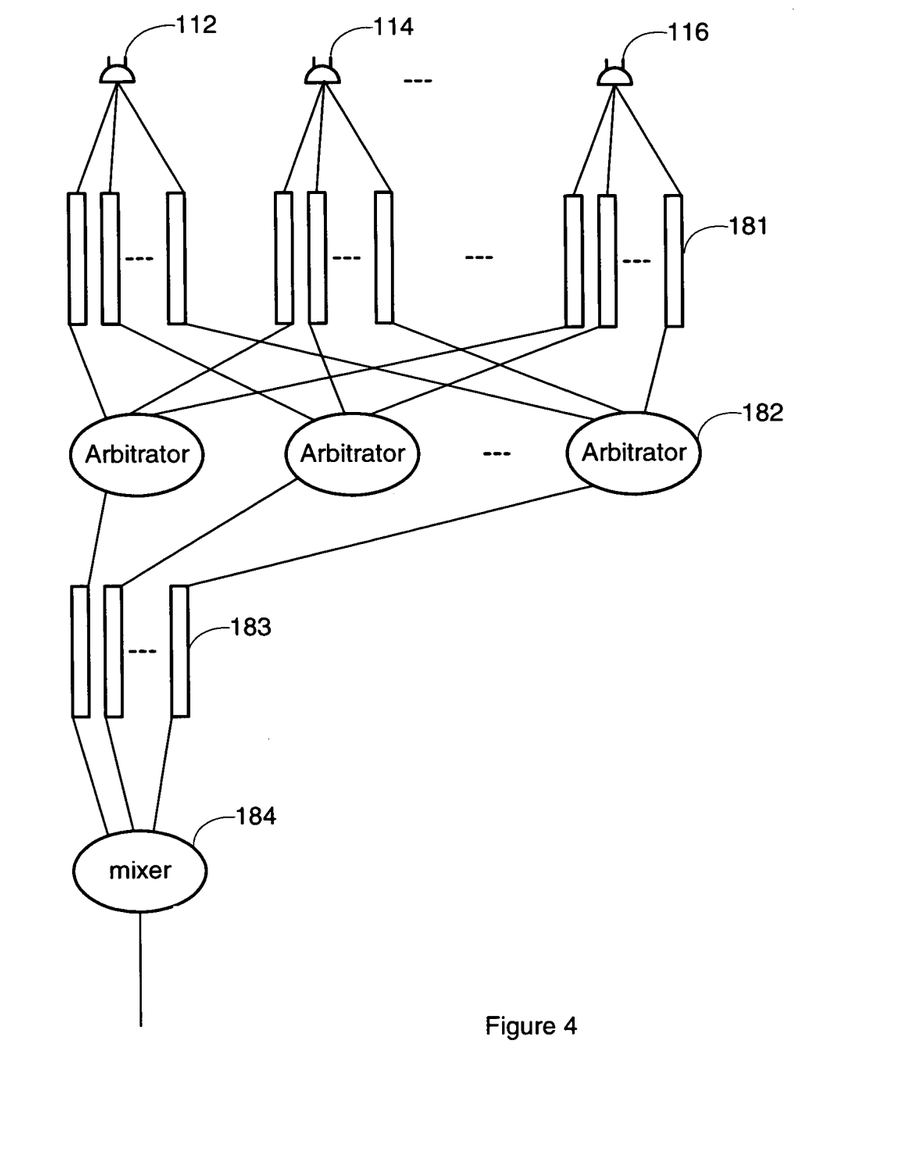
FIG. 4 shows a flow diagram of sub-band arbitration of microphone signals, the remixing and the audio reproduction for the left audio channel.

The microphone signal arbitration or selection described above is simple. According to another embodiment of the current invention, the selection of audio signals or arbitrating signals from different microphones is more elaborate to achieve better audio quality and flexibility. According to this embodiment, sub-band analysis is performed for each microphone signal and the arbitration and selection is conducted at the sub-band level. FIG. 4 illustrates the process for one audio channel of the audio signals. The same process can be used for any audio channels. Similar to the system in FIG. 3, the audio signals from all microphones such as microphones 112, 114 and 116 are collected. The audio signals are processed one time-frame at a time, rather than instantaneously. Once the audio signal is collected from those various microphones for one time frame, each microphone signal is split into a plurality of sub-bands. In the example shown in FIG. 4, one time frame is 20 milliseconds and the sub-bands range from 500 Hertz to 3000 Hertz spaced every 50 Hertz and producing 50 bands. Each microphone signal is divided by the frequency splitters 181. Each sub-band of the audio signals is collected into a band arbitrator 182 for that particular band. For example, all 3000 Hertz band signals are collected at arbitrator 182 as shown in FIG. 4. The sub-band energy for each particular sub-band from each microphone is analyzed. For each sub-band, one of the microphones will have the maximum energy. Thus each sub-band casts one vote for the best microphone. When counting the vote of all 50 bands, one of the microphones will have the largest number of votes. Similar to the discussion above, in some situations where only one talker is speaking, one microphone is selected for one audio channel; in other situations, where more than one talker is speaking, then multiple microphones are selected.

If the number of votes one microphone receives exceeds a threshold, then that microphone is chosen as the microphone for the current time interval. If several microphones receive votes exceeding the threshold, then these several microphones can be selected. If the microphone with the highest number of votes is still less than the threshold, then the best microphone in the prior time interval is chosen. The threshold is adjustable to fit a conference. In one implementation, the threshold is 16. This sub-band analysis method provides a better indication of the best microphone for each individual conference situation and during any time periods of a conference. It provides smoother transition from one talker to another talker.

In the above embodiments of the current invention, selecting microphone signals to form an audio signal for a particular audio channel may be expressed in the following formula, $$\text{Left\_audio\_signal} = \sum_i \text{Gain\_Left}_i \cdot \text{Mic\_Left}_i, \text{ where } \sum_i \text{Gain\_Left}_i = 1$$

for the left channel in a two-audio channel system, where Left_audio_signal is the audio signal for the left audio channel, Gain_left$_i$ is the gain for i'th microphone signal, Mic_Left$_i$ is the i'th microphone signal. When Gain_left$_i$ is substantially 0, the microphone signal from the i'th microphone is "discarded." When Gain_left$_i$ is substantially 1, the microphone signal from the i'th microphone is "selected." If multiple microphones are selected, then the selected microphone's gain is about 1/n, where n is the number of microphones selected.

The microphone gain determination may be easier to implement, for either single microphone selection or multiple signal selections. When a microphone signal is selected, the gain is substantially greater than zero, for example, when a single signal is selected, the gain is greater than 0.8. When two microphone signals are selected, the gain for at least one microphone is greater than 0.4. When a signal is discarded, the gain is substantially equal to zero. For example, in the example shown in FIG. 1, the microphone gain for microphone 111 is 0.95, the microphone gains for microphones 113 and 115 is 0.025 respectively, if only one microphone is selected. The gain distribution could be: 0.45, 0.45, 0.1, or 0.7, 0.3, 0.0 when two microphones are selected.

Referring to FIG. 2, a large number of microphones are used to accommodate many people in a large conference room. In this conference system, one talker is especially close to one microphone, for example talker 231 is very close to microphone 223. Therefore, when talker 231 is speaking, the signal from the microphone 223 is by far the strongest signal. This signal is assigned to the left audio channel. In the right audio channel, the signal from microphone 216 may be the strongest, so it is selected to represent the right channel. But since these two signals, one from microphone 216 and one from microphone 223 differ so much in strength, when they are reproduced at the far end, it would sound like talker 231 were at the far left side of the conference room. This distorts the audio image, making talker 231 sound like he is talking near microphones 215 or 225, rather than at microphone 223. This may cause confusion in the participants at the far end. The relative location as shown in a real-time video image does not match the relative location according to the sound.

According one embodiment of the current invention, such audio image distortion is reduced or eliminated with audio panning. "Panning" means taking a signal and distributing some percentage of it to the left channel and the rest of it to the right channel, assuming a two-channel audio system. Still referring to FIG. 2, instead of using microphone 223 signal for the left audio channel and using microphone 216 signal for the right audio channel exclusively, some mixtures of these signals are used for each channel. A portion of the signal from microphone 223 is mixed with a portion of the signal from microphone 216 to form the right audio channel signal. This way, the right audio channel signal is stronger, without losing much SNR. Similarly, the signal from microphone 223 is attenuated somewhat before it is used for the left audio channel signal, such that the signal in the left audio channel is not too strong.

The amount of mixing and their proportions depend on the relative locations of the microphones. In the example shown in FIG. 2, microphone 223 is $\theta_L$ degrees away from the center of the conference room, or the center line of the camera view. So it is panned $\theta_L$ degrees to the center of the camera view. Similarly, microphone 216 is $\theta_R$ away from the center line. When it is used into audio channels, it is panned $\theta_R$ degrees. With the panning of the microphone signals into both left and right audio channels, the audio image of talker 231 is repositioned to be $\theta_L$ away from the center line. Thus, the audio image of talker 231 matches the video image on the video display. Audio panning is well known in music mixing, which is used to reposition an audio image. The positioning angles $\theta_R$ or $\theta_L$ are known because the microphone positions are known. To adjust the microphone signals to achieve such audio image repositioning is well known. It is not discussed here in more details.

When multiple microphone signals are gated for a signal audio channel, each microphone signal may be panned to avoid audio image distortion as discusses above. Each gated microphone signal is attenuated and proportioned among the audio channels. Then in each audio channel, all gated signals are mixed and balanced. For example, still referring to FIG. 2, when both talkers 233 and 231 are talking, the microphones 211 and 223 are selected for the left channel, and microphone 216 may be selected for the right channel. Each microphone signal from microphones 211, 233 and 216 is panned into the left channel and the right channel according to each microphone's position.

Similarly, if talkers 234 and 233 are talking at the same time, microphones 212 and 233 are selected for right channel and left channel respectively. Both signals will be panned into the other channel to properly position the audio images of the talkers.

In the above examples, two audio channels are utilized. When there is enough bandwidth and processing power in the teleconferencing units, more audio channels may be setup and transmitted to the far end teleconferencing unit. Multiple audio channels will reproduce sound that is more realistic and life-like. For example, a five-channel audio system can provide a very realistic sound field.

Figure 6:
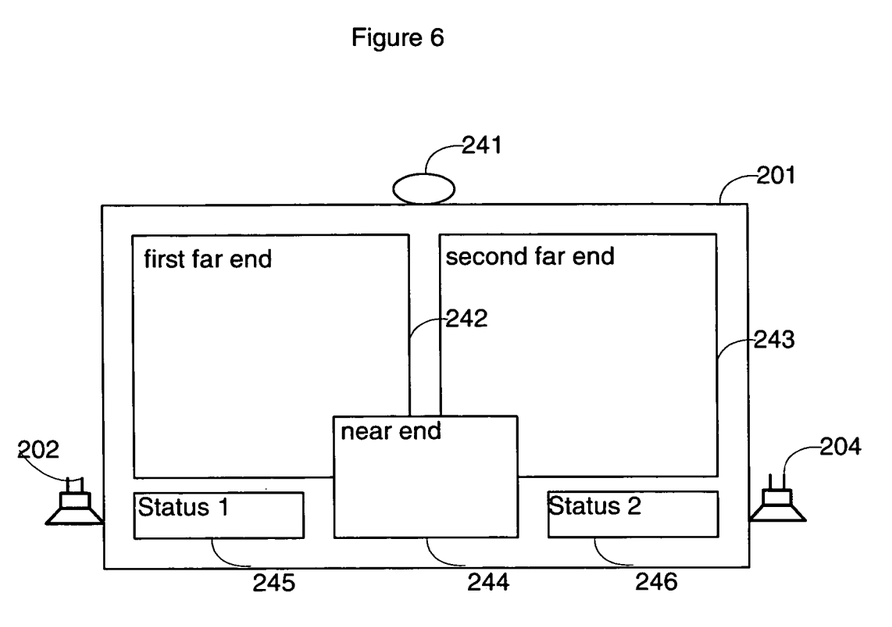
FIG. 6 shows a video screen of a video conference unit with two far end sites.

A stereo audio system is especially useful when a video conference has several conferencing sites. Referring to the setup shown in FIG. 2, the video display screen 201 may be divided into several windows, each showing the participants at each site. For example, as shown in FIG. 6, the first far end site is shown on the left side window 242 on the screen 201, the second far end site is shown on the right side window 243 on the screen 201. The near end site may be shown as a small insert 244 at the bottom of screen 201. There are two more windows 245 and 246 at the bottom of the screen 201 to display current status information about the conference. The two audio channels received from each far end site are reproduced through the loudspeakers 202 and 204. The audio signals from the first far end site may be panned slightly to the left, while the audio signals received from the second far end site may be panned slightly to the right. This way, the audio image for each far end site is separated from each other, in addition to the separation of individual talker within each site. The audio image of each talker matches his video image shown on the screen 201. Because the speech from each talker at the far end is spatially distinct, it is much more comprehensible than if it is mixed with other talker's speeches.

To further refine the acoustic signals in the teleconferencing unit as described above, the microphone signals may undergo additional acoustic signal processing such as stereo echo cancellation, stereo AGC, stereo noise suppression or other processing. These additional acoustics signal processing may be selected depending on the prior processing of the microphone signals. For instance, a noise suppression algorithm will have a noise spectral shape unique to each microphone. The noise spectral shape for each microphone is stored in a memory module accessible by the acoustic signal processor. Therefore, based on which microphone is selected, the acoustic processor may use the noise spectral shape to reduce the noise from that particular microphone. Stereo AGC may be activated to recondition a microphone signal before it is sent to the microphone signal arbitrator. Stereo AGC may adjust the gain on the microphone to compensate the varied loudness of talkers' speeches. For loud talker, the gain may be adjusted lower so that the peaks of the signal do not get chopped off. For soft talker, the gain may be adjusted higher so that the signal strength reaches the strength threshold and the signal can be selected by the arbitrator. Without enough signal strength, the soft talker's speech may be discarded by the arbitrator as if it were background noise.

Similarly, a microphone profile may be stored for each microphone. This profile may be used during further signal processing such that only necessary processing for the particular microphone is used, and the unnecessary or unhelpful processing is avoided. The microphone profile for each microphone may include its position and related panning factors. Its position and related panning factors are used during panning operation to pan the signal to all the audio channels, whether two or more audio channels are used. The profile may include a noise spectrum, which is used in noise suppression. The profile may further include a frequency response spectrum, which is used in AGC.

Figure 7:
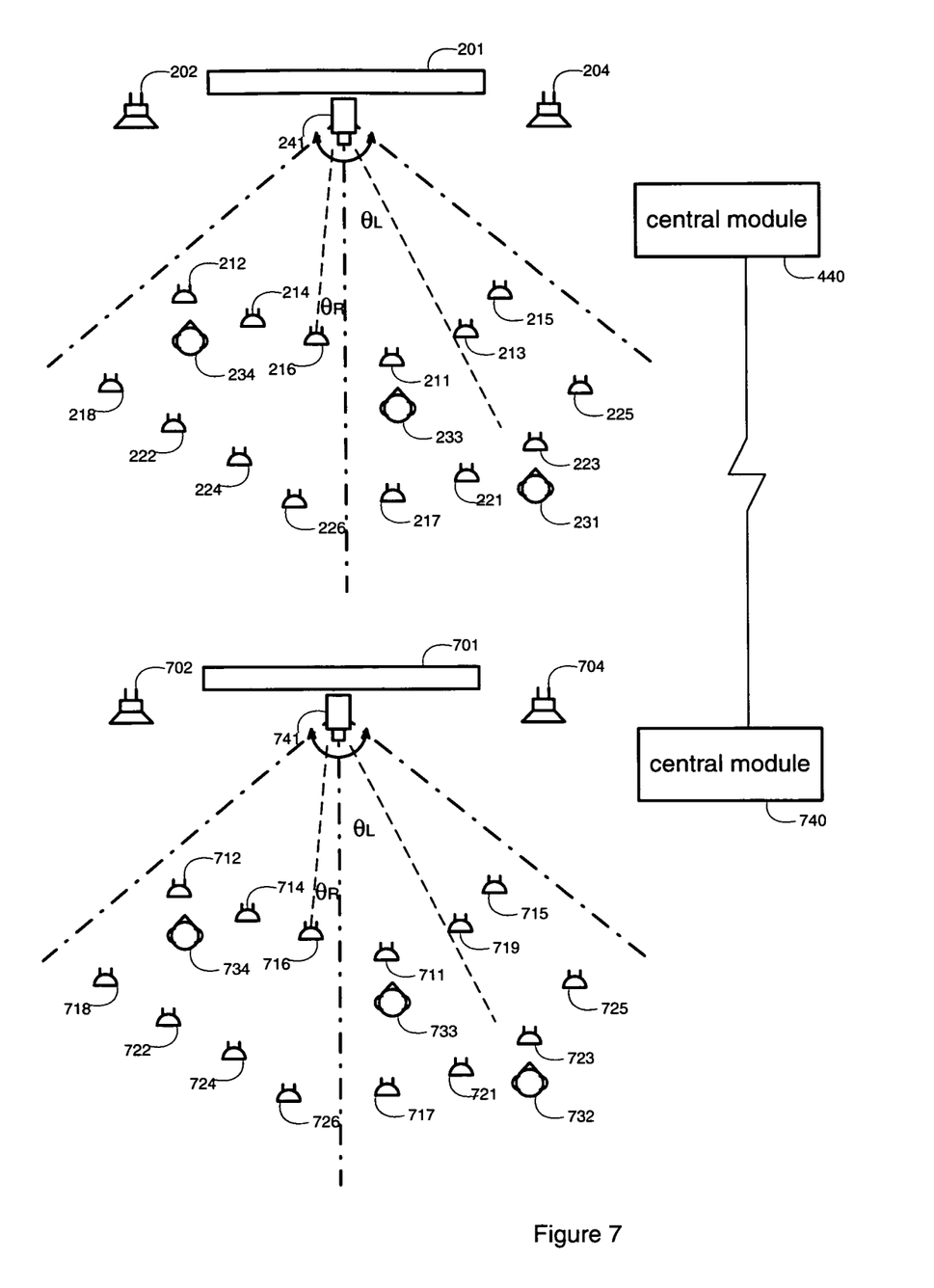
FIG. 7 shows a video conference system with one near end site and one far end site.

When two video conference units as discussed above are connected together, they form a better video conference system, as illustrated in FIG. 7. The conference system shown in FIG. 7 has two sites, each of which has a videoconference unit, as shown in FIG. 2. The near end central module 440 is connected to far end central module 740 through network interfaces (not shown) on each device. The central module 440 and 740 are coupled to their components as shown in FIG. 7. For simplicity, the connections between components and the central modules are not shown. This video conference system can bring a much better conference experience to all participants, as if they were having a conference in the same conference room.

The embodiments of the current invention provide more realistic life-like sound reproduction, such as stereo sound or multi-channel surround sound, at each site of a teleconference using multi-channel audio processing. The embodiments of the current invention exploit the spatial discrimination of the bi-aural human hearing to distinguish different locations of different talkers during a teleconferencing and improve their speech intelligibilities. The embodiments of the current invention use various ways to select the best audio signals from many microphones within the conference system. The embodiments of the current invention greatly improve the quality of teleconferencing.

While illustrative embodiments of the invention have been illustrated and described, it will be appreciated that various changes can be made therein without departing from the spirit and scope of the invention.

We claim:

1. A method for processing multi-channel audio signals in a teleconference, the method comprising:
   receiving microphone signals from a plurality of microphones, each microphone signal assigned to one of a plurality of audio channels;
   arbitrating the microphone signals for each channel to develop one or more selected microphone signals;
   forming an audio signal for each channel from the one or more selected microphone signals; and
   sending the audio signal for each channel to a far end.

2. The method in claim 1,
   wherein the step of arbitrating the microphone signals for each channel includes:
      comparing a microphone signal strength to a strength threshold;
      selecting the microphone signal if its signal strength is greater than the strength threshold; and
      discarding the microphone signal if its signal strength is less than the strength threshold.

3. The method in claim 2,
   wherein selecting the microphone signal if its signal strength is greater than the strength threshold is to assign a microphone signal gain substantially greater than zero; and
   wherein discarding the microphone signal if its signal strength is less than the strength threshold is to assign a microphone signal gain substantially equal to zero.

4. The method in claim 1,
   wherein the step of arbitrating the microphone signals for each channel includes:
      selecting the microphone signal with the greatest signal strength; and
      discarding the remaining microphone signals.

5. The method in claim 4,
   wherein selecting the microphone signal with the greatest signal strength is to assign a microphone signal gain of 1 to the selected microphone signal; and
   wherein discarding the remaining microphone signals is to assign a microphone signal gain of 0 to the remaining microphone signals.

6. The method in claim 4,
   wherein selecting the microphone signal with the greatest signal strength is to assign a microphone signal gain substantially equal to 1 to the selected microphone signal; and
   wherein discarding the remaining microphone signals is to assign a microphone signal gain substantially equal to 0 to the remaining microphone signals.

7. The method in claim 1, further comprising:
   accumulating microphone signals for one time frame; and
   splitting each microphone signals in the time frame into a plurality of frequency-band-limited sub-bands,
   wherein arbitrating the microphone signals for each channel includes steps of:
      for each sub-band, comparing the sub-band signals from all microphones;
      giving a vote to the microphone having the greatest signal energy;
      adding all votes for all sub-bands for each microphone; and
      selecting a microphone signal whose number of votes exceeds a vote threshold for the time frame.

8. The method in claim 7,
   wherein arbitrating the microphone signals for each channel further includes steps of:
      if more than one microphones are selected whose number of votes exceeds a vote threshold for the time frame, keeping one microphone signal whose number of votes is the largest; and
      discarding the other selected microphone signals.

9. The method in claim 7,
   wherein arbitrating the microphone signals for each channel further includes a step of:
      selecting the microphones that were selected for a previous time frame, if no microphone has votes exceeding the threshold for the time frame.

10. The method in claim 7,
    wherein splitting each microphone signal in the time frame into a plurality of frequency-band-limited sub-bands is to splitting each microphone signal into at least 50 sub-bands, and the vote threshold is 16.

11. The method in claim 1, wherein said forming an audio signal includes:
    panning a selected microphone signal for one audio channel into the other audio channels based on the selected microphone's position.

12. The method in claim 11, where said forming an audio signal includes:
    panning every selected microphone signal for every audio channel based on the microphone's position.

13. The method in claim 1, further comprising:
    showing images of conference participants on a video display; and
    adjusting selected microphone signal levels to match the audio image position of a talker with the video image position of the talker as shown on the video display.

14. The method in claim 1, further comprising performing Automatic Gain Control.

15. The method in claim 1, further comprising performing noise suppression.

16. The method in claim 1, further comprising retrieving profiles of the selected microphones and processing the audio signals according to the retrieved profile of the selected microphones.

17. The method in claim 16, wherein the profile of each microphone includes at least the following information of the microphone: the microphone position and the noise spectrum.

18. A teleconference unit comprising:
    a network interface;
    a processing module coupled to the network interface;
    an audio input interface coupled to the processing module for receiving audio input signals; and
    an audio output interface coupled to the processing module for sending out audio output signals to loudspeakers,
    wherein the processing module is operable to:
       receive a plurality of microphone signals from the audio input interface, each of which is assigned to one of a plurality of audio channels;
       arbitrate the microphone signals for each audio channel to develop one or more selected microphone signals;
       form an audio signal for each channel from the selected microphone signals;
       encode audio channels into one or more audio signals;
       send the audio signals to a far end teleconference unit via the network interface;
       receive far end audio signals from the far end teleconference unit; and
       decode the far end audio signals into far end audio channels; and
       reproduce the far end audio channels through the loudspeakers via audio output interface.

19. The teleconference unit in claim 18, further comprising:
a plurality of microphones coupled to the audio input interface; and
a plurality of loudspeakers coupled to the audio output interface.

20. The conference unit in claim 18,
wherein the processing module is operable to arbitrate the microphone signals for each audio channel includes operability to,
compare the microphone signal strength to a strength threshold;
select the microphone signal if its signal strength is greater than the strength threshold; and
discard the microphone signal if its signal strength is less than the strength threshold.

21. The conference unit in claim 20,
wherein to select the microphone signal if its signal strength is greater than the strength threshold is to assign a microphone signal gain substantially greater than zero; and
wherein to discard the microphone signal if its signal strength is less than the strength threshold is to assign a microphone signal gain substantially equal to zero.

22. The conference unit in claim 18,
wherein the processing module is operable to arbitrate the microphone signals for each audio channel includes operability to,
select the microphone signal with the greatest signal strength; and
discard the remaining microphone signals.

23. The conference unit in claim 22,
wherein to select the microphone signal with the greatest signal strength is to assign a microphone signal gain of 1 to the selected microphone signal; and
wherein to discard the remaining microphone signals is to assign a microphone signal gain of 0 to the remaining microphone signals.

24. The conference unit in claim 22,
wherein to select the microphone signal with the greatest signal strength is to assign a microphone signal gain substantially equal to 1 to the selected microphone signal; and
wherein to discard the remaining microphone signals is to assign a microphone signal gain substantially equal to 0 to the remaining microphone signals.

25. The conference unit in claim 18,
wherein the processing module is further operable to,
accumulate microphone signals for one time frame; and
split each microphone signals in the time frame into a plurality of frequency-band-limited sub-bands, and
wherein to arbitrate the microphone signals for each channel includes:
for each sub-band, to compare the sub-band signals from all microphones;
to give a vote to the microphone having the greatest signal energy;
to add all votes for all sub-bands for each microphone; and
to select a microphone signal whose number of votes exceeds a vote threshold for the time frame.

26. The conference unit in claim 25,
wherein to arbitrate the microphone signals for each channel includes:
if more than one microphones are selected whose number of votes exceeds a vote threshold for the time frame, to keep one microphone signal whose number of votes is the largest; and
to discard the other selected microphone signals.

27. The conference unit in claim 25,
wherein to arbitrate the microphone signals for each channel includes:
to select the microphones that were selected for a previous time frame, if no microphone has votes exceeding the threshold for the time frame.

28. The conference unit in claim 25,
wherein to split each microphone signal in the time frame into a plurality of frequency-band-limited sub-bands is to split each microphone signal into at least 50 subbands, and the vote threshold is 16.

29. The conference unit in claim 18,
wherein the processing module is operable to form an audio signal for each channel from the selected microphone signals includes operability to pan a selected microphone signal for one audio channel into the other audio channels based on the selected microphone's position.

30. The conference unit in claim 29,
wherein the processing module is operable to form an audio signal for each channel from the selected microphone signals includes operability to pan every selected microphone signal for every audio channel based on the microphone's position.

31. The conference unit in claim 18, wherein the processing module is further operable to perform Automatic Gain Control.

32. The conference unit in claim 18, wherein the processing module is further operable to perform noise suppression.

33. The conference unit in claim 18, wherein the processing module is further operable to retrieve profiles of the selected microphones and process the audio signals according to the retrieved profile of the selected microphones.

34. The conference unit in claim 33, wherein the profile of each microphone includes at least the following information of the microphone: the microphone position and the noise spectrum.

35. The teleconference unit in claim 18, further comprising:
a video input interface coupled to the processing module for receiving video signals; and
a video output interface coupled to the processing module for sending out video signals to a video display.

36. The teleconference unit in claim 35,
wherein the processing module is further operable to adjust selected microphone signals to match the audio image position of a talker with the video image position of the talker as shown on a video display.

37. A teleconference system comprising:
a first teleconference unit at a near end includes,
a first network interface,
a first processing module coupled to the first network interface,
a first audio input interface coupled to the first processing module for receiving audio input signals, and
a first audio output interface coupled to the first processing module for sending out audio output signals to loudspeakers; and
a second teleconference unit at a far end coupled to the first teleconference unit through a network, includes,
a second network interface coupled to the first network interface through the network, a second processing module coupled to the second network interface, a second audio input interface coupled to the second processing module for receiving audio input signals, and a second audio output interface coupled to the second processing module for sending out audio output signals to loudspeakers;

wherein the first processing module is operable to:
receive a plurality of microphone signals from the first audio input interface, each of which is assigned to one of a plurality of audio channels,
arbitrate the microphone signals for each audio channel to develop one or more selected microphone signals,
form an audio signal for each channel from the selected microphone signals,
encode audio channels into one or more audio signals,
send the audio signals to the second teleconference unit via the first network interface,
receive far end audio signals from the second teleconference unit,
decode the far end audio signals into far end audio channels, and
reproduce the far end audio channels through the loudspeakers via the first audio output interface; and wherein the second processing module is operable to:
receive a plurality of microphone signals from the second audio input interface, each of which is assigned to one of a plurality of audio channels,
arbitrate the microphone signals for each audio channel to develop one or more selected microphone signals,
form an audio signal for each channel from the selected microphone signals,
encode audio channels into one or more audio signals,
send the audio signals to the first teleconference unit via the second network interface,
receive near end audio signals from the first teleconference unit,
decode the near end audio signals into near end audio channels, and
reproduce the near end audio channels through the loudspeakers via the second audio output interface.

38. The teleconference system in claim 37,
wherein the first processing module is operable to arbitrate the microphone signals for each audio channel includes operability to,
compare the microphone signal strength to a strength threshold;
select the microphone signal if its signal strength is greater than the strength threshold; and
discard the microphone signal if its signal strength is less than the strength threshold.

39. The teleconference system in claim 38,
wherein to select the microphone signal if its signal strength is greater than the strength threshold is to assign a microphone signal gain substantially greater than zero; and wherein to discard the microphone signal if its signal strength is less than the strength threshold is to assign a microphone signal gain substantially equal to zero.

40. The teleconference system in claim 37,
wherein the first processing module is operable to arbitrate the microphone signals for each audio channel includes operability to,
select the microphone signal with the greatest signal strength; and
discard the remaining microphone signals.

41. The teleconference system in claim 40,
wherein to select the microphone signal with the greatest signal strength is to assign a microphone signal gain of 1 to the selected microphone signal; and
wherein to discard the remaining microphone signals is to assign a microphone signal gain of 0 to the remaining microphone signals.

42. The teleconference system in claim 40,
wherein to select the microphone signal with the greatest signal strength is to assign a microphone signal gain substantially equal to 1 to the selected microphone signal; and
wherein to discard the remaining microphone signals is to assign a microphone signal gain substantially equal to 0 to the remaining microphone signals.

43. The conference system in claim 37,
wherein the first processing module is further operable to,
accumulate microphone signals for one time frame; and
split each microphone signals in the time frame into a plurality of frequency-band-limited sub-bands, and
wherein to arbitrate the microphone signals for each channel includes:
for each sub-band, to compare the sub-band signals from all microphones;
to give a vote to the microphone having the greatest signal energy;
to add all votes for all sub-bands for each microphone; and
to select a microphone signal whose number of votes exceeds a vote threshold for the time frame.

44. The conference system in claim 43:
wherein to arbitrate the microphone signals for each channel includes:
if more than one microphones are selected whose number of votes exceeds a vote threshold for the time frame, to keep the one microphone signal whose number of votes is the largest; and
to discard the other selected microphone signals.

45. The conference system in claim 44:
wherein to arbitrate the microphone signals for each channel includes:
to select the microphones that were selected for a previous time frame, if no microphone has votes exceeding the threshold for the time frame.

* * * * *